IEEE STANDARD FLOATING POINT DATA FORMATS

SINGLE PRECISION:

DOUBLE PRECISION:

United States Patent [19]
Yu et al.

[11] Patent Number: 5,602,769
[45] Date of Patent: Feb. 11, 1997

[54] METHOD AND APPARATUS FOR PARTIALLY SUPPORTING SUBNORMAL OPERANDS IN FLOATING POINT MULTIPLICATION

[75] Inventors: Robert K. Yu, Nework; Grzegorz B. Zyner, San Jose, both of Calif.

[73] Assignee: Sun Microsystems, Inc., Mountain View, Calif.

[21] Appl. No.: 498,144

[22] Filed: Jul. 5, 1995

[51] Int. Cl.⁶ .................................................. G06F 7/38
[52] U.S. Cl. ............................................................ 364/748
[58] Field of Search ............................ 364/748; 395/425

[56] References Cited

U.S. PATENT DOCUMENTS

| | | | |
|---|---|---|---|
| 4,800,516 | 1/1989 | Si et al. | 364/748 |
| 4,975,868 | 12/1990 | Freerksen | 364/748 |
| 5,175,841 | 12/1992 | Magar et al. | 395/425 |

OTHER PUBLICATIONS

M. Nagamatsu et al., "A 15 NS 32X32–Bit CMOS Multiplier with an Improved Parallel Structure", IEEE Jun. 1989 Custom Integrated Circuits Conference, pp. 10.3.1–10.3.4.
R. Sharma et al., "A 6.75–ns 16X16–bit Multiplier in Single–Level–Metal CMOS Technology", IEEE Journal of Solid–State Circuits, vol. 24, No. 4, Aug. 1989, pp. 922–926.
W. K. Luk et al., "Recursive Implementation of Optimal Time VLSI Integer Multipliers", VLSI 1983, pp. 155–168.
C. Lerouge et al., "A Fast 16 Bit NMOS Paralle Multiplier", IEEE Journal of Solid–State Circuits, vol. SC–19, No. 3, Jun. 1994, pp. 338–342.

Primary Examiner—Roy N. Envall, Jr.
Assistant Examiner—Monica Lewis
Attorney, Agent, or Firm—Limbach & Limbach L.L.P.

[57] ABSTRACT

A method for fully supporting floating point multiplication using a combination of partial hardware support and partial software support traps to software when a subnormal operand is encountered and gross underflow cannot be determined without determining the leading zeros in the subnormal mantissa. A simplified hardware multiplier does not require leading zero detection or left or right shifting. The partial hardware support circuit allows single and double precision operands. The hardware multiplier unit only partially supports subnormal operands. If one of the operands is subnormal, the hardware multiplier unit will output zero and a gross underflow signal if the multiplication would result in gross underflow. There is a small minority of operand permutations that are not supported in hardware and thus require a greater time to compute by resorting to software. However, the vast majority of operand permutations gain reduced latency. So long as the fraction of operand permutations that occurs when a typical instruction stream is executing that are not supported in hardware is small, a performance gain is achieved. An alternative embodiment of the present invention, the gross underflow output is computed in parallel with the resulting exponent computation. An implementation of the gross underflow detection circuit can be used for either single or double precision operands.

22 Claims, 8 Drawing Sheets

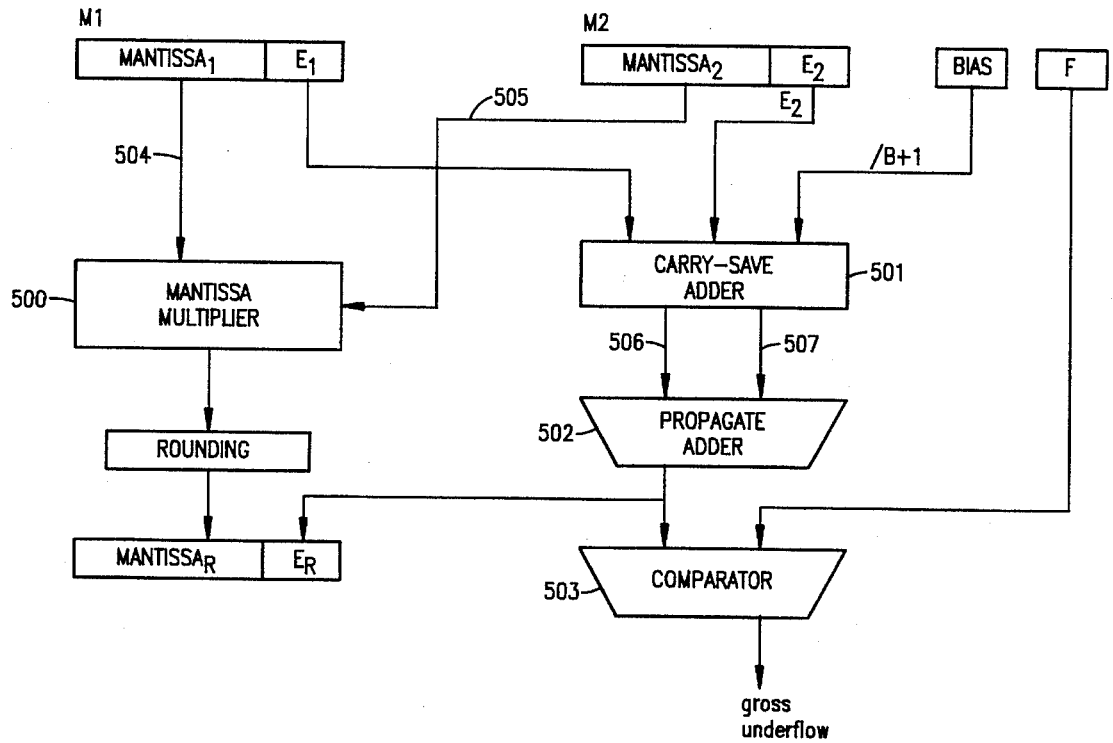

METHOD AND APPARATUS FOR PARTIALLY SUPPORTING SUBNORMAL OPERANDS IN FLOATING POINT MULTIPLICATION

BACKGROUND OF THE INVENTION

1. Field of the Invention

The present invention relates to the field of floating point units in microprocessors. Specifically, the present invention relates to hardware floating point multipliers and the support of subnormal operands in floating point multiplications.

2. Discussion of the Related Art

Multiplier units are commonly found in digital signal processors and more recently in RISC-based processors. Double precision floating point operations involve the inherently slow operation of summing 53 partial products together to produce the product. IEEE compliant multiplication also involves the correct rounding of the product adjustment to the exponent and generation of correct exception flags. Multiplier units imbedded in modern RISC-based processors must also be pipelined, small and fast. Judicious functional and physical partitioning are needed to meet all these requirements. FIG. 1 shows the standard IEEE floating point data formats. The floating point the value definitions according to IEEE standards corresponding to the floating point data formats shown in FIG. 1 are given below.

s=sign e=biased exponent f=fraction

E=number of bits in exponent (8 for single, 11 for double)

F=number of bits in fraction (23 for single, 52 for double)

B=exponent bias (127 for single, 1023 for double)

Normalized Value ($0<e<2^{E-1}$):

$(-1)^s \times 2^{e-B} \times 1.f$

Subnormal Value (e=0):

$(-1)^s \times 2^{1-B} \times 0.f$

Zero:

$(-1)^s \times 0$

A floating point number is analogous to a number in scientific notation with the primary difference being in the IEEE standard, the number is in a base 2 number representation system whereas in standard scientific notation, numbers are represented in base 10. Thus, a floating point number has an exponent which represents the binary order of magnitude by which its mantissa must be multiplied. In a normalized floating point number, the implicit leading 1 as well as all F fractions bits are significant. Therefore, the mantissa of a normalized floating point number always has F+1 significant binary digits in the mantissa.

The IEEE standard for floating point numbers includes two different precisions for floating point numbers. As depicted in FIG. 1, the first type, single precision floating point numbers, have 23 fraction bits (FRACTION[22:0]) and 8 exponent bits (EXP[7:0]); whereas the second type, double precision floating point numbers, have 52 fraction bits (FRACTION[51:0]) and 11 exponent bits (EXP[11:0]).

Because the exponent is represented by a fixed number of bits according to the IEEE standard, upper and lower limits exist to the absolute values of numbers which can be represented in normalized form. The minimum value for the exponent is defined to be one, However, supporting subnormal numbers allows the expansion of the lower absolute value range of representable numbers in floating point format. Because the leading one in a normalized number and the leading zero in a subnormal number are implied rather than explicitly included in the data stored, this leading bit cannot be used to distinguish normalized from subnormal numbers. Instead, one exponent value, zero, is reserved to indicate that the corresponding mantissa is from a subnormal number, therefore the leading bit is a zero. Therefore, every subnormal number has the minimum possible representable exponent field, zero, and has a mantissa with fewer significant digits than in a normalized number. Although the exponent field for a subnormal number is zero, this is simply a code to indicate that the number is subnormal in order to distinguish subnormal numbers from normal numbers. The value of the exponent for a subnormal number is interpreted as being one, as indicated in equation 2.

Because it is generally desirable to maintain the full precision of mantissa, subnormal numbers having fewer significant digits are only allowed when the exponent has reached its minimum value such that it is necessary to sacrifice precision in order to expand the range of representable numbers. Thus, the absolute value of any subnormal number is less than the absolute value of any normalized number. By permitting subnormal numbers to be represented, the range of representable numbers is increased by F binary orders of magnitude. Thus, between zero and the smallest positive normalized number, there are F binary orders of magnitude of representable subnormal numbers.

Binary multiplication of two floating point numbers M1 and M2 is analogous to the multiplication of two base 10 numbers in scientific notation. The mantissas of the operands M1 and M2 are multiplied by each other to produce the resultant mantissa while the exponents e1 and e2 of the operands M1 and M2 are added to produce the resulting exponent er. Typically, a hardware multiplier unit supports all possible operand combinations. Therefore, a typical hardware multiplier will support the multiplication of two normalized operands and the multiplication of one normalized operand and a second subnormal operand. Typical hardware multipliers will not support the multiplication of two subnormal operands, because such a multiplication will always produce a result which is smaller than the smallest subnormal number.

Each multiplication takes two operands, M1 and M2. If both M1 and M2 are normalized floating point numbers, then the mantissa for M1 is 1.f1, and the mantissa for M2 is 1.f2. Because each normalized number has an implicit leading 1, every normalized number has F+1 significant bits. The result output by the mantissa multiplier 200 takes the form 1.fr, where the number of bits in the fraction part fr is either 2F or 2F+1, depending upon the sizes of f1 and f2. When the number of bits in the fraction part is 2F, this is described as "non-overflow." When the number of bits in the fraction part is 2F+1, this is described as "overflow."

The overflow-non-overflow distinction is easily understood with a base 10 analogy. 11*11=121. In scientific notation, this is $1.1 \times 10^1 * 1.1 \times 10^1 = 1.21 \times 10^2$. Here the number of fraction digits in the output is twice the number of fraction digits in the inputs—this is non-overflow. 99*99= 9801. In scientific notation, this is $9.9 \times 10^1 * 9.9 \times 10^1 = 98.01 \times 10^2 = 9.801 \times 10^3$. Here the number of fraction digits in the output is one plus twice the number of fraction digits in the inputs—this is overflow. In the overflow situation, the exponent must be incremented by one. Usually, it is desirable that the result R produced by a multiplication will have the same precision (the same number of significant bits) as each of the operands M1 and M2.

If the mantissa multiplier 200 array produces 2F significant mantissa fraction bits, while the result R can include only F significant mantissa fraction bits, the least significant F mantissa bits output by the multiplier are used only to produce the three rounding bits—the guard, round, and sticky bits—for rounding purposes. The least significant F mantissa bits output from the mantissa array are then discarded.

A subnormal number takes the form 0.f. Since the most significant bit of any subnormal number is an implicit zero, a subnormal number has at most F significant bits. However, a subnormal number can have as few as only 1 significant bit, if the only non-zero fraction bit is the least significant bit of the fraction. The positive subnormal number having only 1 significant bit is the smallest non-zero positive representable number.

FIG. 2 illustrates the logical structure of a typical floating point multiplier unit. With high modern clock frequencies, a typical modern floating point unit will include pipeline registers at various points. The illustration of these registers is omitted for simplicity. Multiplier units that handle subnormal operands and results often require the determination of leading zeros, adjustments to the input and output mantissas (shifting), adjustment to the output exponent, and rounding. The calculation of the resultant exponent er is complicated by the supporting of subnormal numbers. The exponent e in a floating point number is biased by an exponent bias B. In a subnormal number, there is an implicit leading zero and there may be up to F−1 additional leading zeros. For purposes of multiplication, when one or more of the operands is subnormal, that subnormal operand is converted into a normalized mantissa before being input into the mantissa multiplier array 200.

FIG. 2 illustrates the hardware necessary to support all the possible input combinations. In FIG. 2, a leading zero detector 201 determines if one of the operands M1 is subnormal, and if so, how many leading zeros are in the mantissa. The number of leading zeros is referred to as z. FIG. 3 illustrates one way a leading zero detector can be implemented. The latency of the leading zero detector in FIG. 3 is proportional to the $\log_2 N$, where N is the of the number of inputs (I0 through I15 in FIG. 3). The silicon area required to implement the hardware in FIG. 3 is proportional to $N\log_2 N$. The leading zero detector 201 in FIG. 3 produces an encoded left shift output (z3, z2, z1, and z0). The encoded output 202 (in FIG. 2) is necessary to properly adjust the output exponent er according to Equation 2. Inverter 206 converts the encoded output 202 of the leading zero detector 201 into its one's complement. By hooking the carry input Cin to the carry-save adder 207 to a one, the negative of z in two's complement form is supplied to the carry save adder 207. The encoded output 202 is also necessary to drive the left shifter 203. FIG. 4 illustrates one way to implement a left shifter. The left shifter shown in FIG. 4, a barrel shifter, is constructed of an array of 2-to-1 multiplexors. The left shifter 203 converts a subnormal mantissa into a normalized mantissa, so that the most significant one in the subnormal mantissa is shifted into the most significant output 400 (in FIG. 4) of the left shifter 203. The latency of the left shifter in FIG. 4 is proportional to $\log_2 N$. The silicon area required to implement the hardware in FIG. 4 is proportional to $N\log_2 N$.

Because the result R may be subnormal, the output 204 of the mantissa multiplier 200 is input into a right shifter 205. The right shifter 205 is implemented similarly to the left shifter 203. The quantity rshift is input to the right shifter 205, and is calculated according to Equations 2 and 3 by the rshift logic block 208.

By fully supporting multiplication in hardware when one of the operands is subnormal, the hardware requirements for the resultant mantissa and exponent calculations are substantial. In FIG. 2, the carry-save adder 207 exists only to add in the two's complement of z. Additionally, the rshift logic 208 is necessary to control the right shifter 205. If the multiplier unit is implemented as shown in FIG. 2, the rshift logic 208 is of non-trivial complexity. The leading zero detector 202, the left shifter 203, the right shifter 205, the rshift logic 208, the inverter 206, and the carry-save adder 207 are all necessary to support multiplication where one of the operands is subnormal.

As is apparent from the above discussion, it is desirable to avoid overly complicating the multiplier hardware. There is a need for an efficient hardware multiplier that reduces size and latency. As long as a the fraction of multiplication operand permutations that are not supported in hardware is statistically insignificant, a performance gain could be achieved.

SUMMARY OF THE INVENTION

An object of the present invention is reducing average latency of floating point multiplication instructions by reducing hardware complexity of a floating point multiplier. A secondary object of the present invention is to reduce the hardware cost of the hardware multiplier.

The present invention presents a method for fully supporting floating point multiplication using a combination of partial hardware support and partial software support. A simplified hardware multiplier and an alternate implementation are presented. The partial hardware support circuit for single precision and double precision is described.

According to the present invention, the hardware multiplier unit only partially supports subnormal operands. If one of the operands is subnormal, the hardware multiplier unit will output zero and a gross underflow signal if the multiplication would result in gross underflow. There is a small minority of operand permutations that are not supported in hardware and thus require a greater time to compute by resorting to software. However, the vast majority of operand permutations gain reduced latency. So long as the fraction of operand permutations that occurs when a typical instruction stream is executing that are not supported in hardware is small, a performance gain is achieved.

According to an alternative embodiment of the present invention, the gross underflow output is computed in parallel with the resulting exponent computation using a propagate adder 603. An implementation of the gross underflow detection circuit can be used for either single or double precision operands.

The method for processing floating point multiplication instructions according to the present invention involves using a combination of hardware and software to fully support subnormal operations.

These and other features and advantages of the present invention are apparent from the Figures as explained in the detailed description of the invention.

Figure 1:
FIG. 1 illustrates the IEEE standard single precision and double precision floating point data representations.
Figure 1:

The various features and advantages of the present invention are apparent from the figures described in detail in the detailed description of the invention.

DETAILED DESCRIPTION OF THE INVENTION

The present invention presents a method for fully supporting floating point multiplication using a combination of partial hardware support and partial software support. A simplified hardware multiplier and an alternate implementation are presented. The partial hardware support circuit for single precision and double precision is described.

In multiplication, the resultant exponent $e_r$ is calculated by:

$$e_r = e_1 + e_2 - B - z_1 - z_2 \tag{1}$$

where $e_1$ and $e_2$ are the biased exponents, and $z_1$ and $z_2$ are the number of leading zeros in the mantissas to the multiplicand M1 and multiplier M2, respectively. Equation 1 is simplified by noting that, if both operands M1 and M2 are subnormal (e1=e2=0), then the value of $e_r$ underflows to a value no greater than −B, and thus the exponent cannot be represented in the same precision as the operands even in subnormal format, because the exponent for subnormal numbers is 1−B, and this is the minimum exponent allowed. Therefore, the constraint that only one operand can be subnormal can be imposed without loss of generality by rewriting Equation 1 as:

$$e_r = e_1 + e_2 - B - z \tag{2}$$

where z is the number of leading zeros of the subnormal operand, if any. As long as one of the operands is normalized, the mantissa multiplier unit will always produce enough significant bits for a normalized output result R. However, if the exponent of the normalized operand is less than B+z, the resultant output R is subnormal, since the resultant exponent er will be less than the minimum representable exponent value. In the case of a subnormal result R, the resulting value $e_r$ is less than one, and the amount rshift by which the resulting mantissa needs to be right-shifted to set $e_r = 1$ is:

$$\text{rshift} = 1 - e_r \tag{3}$$

If the rshift value is greater than the number of bits in the mantissa, the multiplier underflows beyond the dynamic range of the precision of the operands. This condition is defined as "gross underflow." Specifically, if $$\text{rshift} \geq (F+3) \tag{4}$$

then the mantissa will be right-shifted to the sticky-bit position or beyond and the resulting mantissa is either zero or the smallest subnormal number, depending on the rounding mode. The two cases where rounding will produce the smallest subnormal number are 1) rounding to plus infinity and the result is positive and 2) rounding to minus infinity and the result is negative. All other rounding modes including rounding to nearest and rounding to zero produces zero as the result.

Rewriting Equation 4 in terms of $e_r$ using Equation 3, gross underflow occurs when the following inequality is true.

$$e_r \leq -(F+2) \tag{5}$$

When gross underflow occurs, zero is the appropriate output R. If one of the operands M1 is subnormal and gross underflow does not occur, the appropriate result R may be either normal or subnormal, depending upon e1, e2, and z.

According to the present invention, the hardware multiplier unit only partially supports subnormal operands. If one of the operands is subnormal, the hardware multiplier unit will output zero and a gross underflow signal if the multiplication would result in gross underflow. Otherwise, the multiplier unit will not support the multiplication. In other words, when a multiplication includes a subnormal operand, the hardware multiplier either produces zero (in the case of gross underflow) or traps to software.

Figure 2:
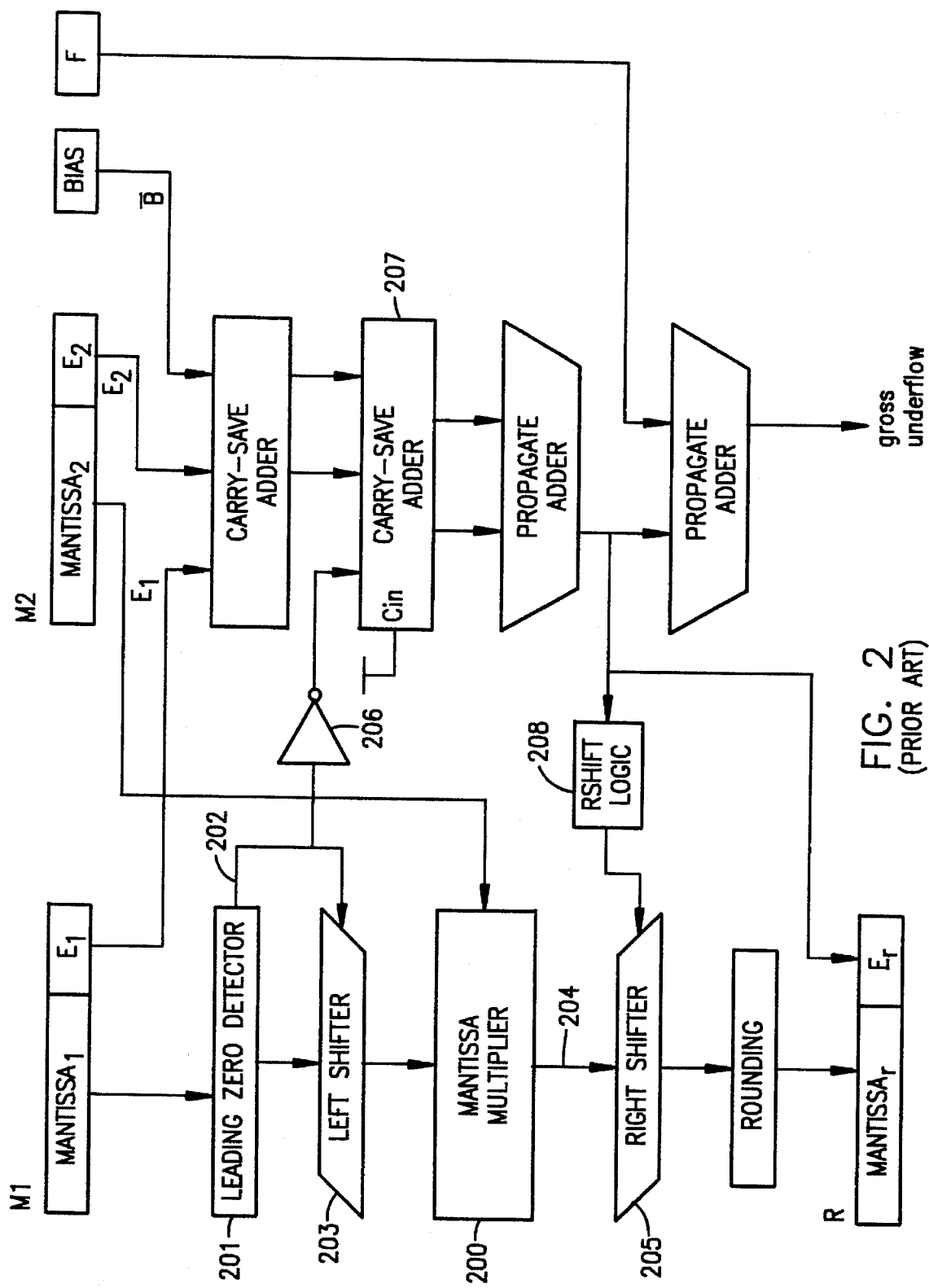
FIG. 2 is a simplified block diagram illustrating a floating point multiplier designed to fully support a subnormal operand in hardware.
Figure 3:
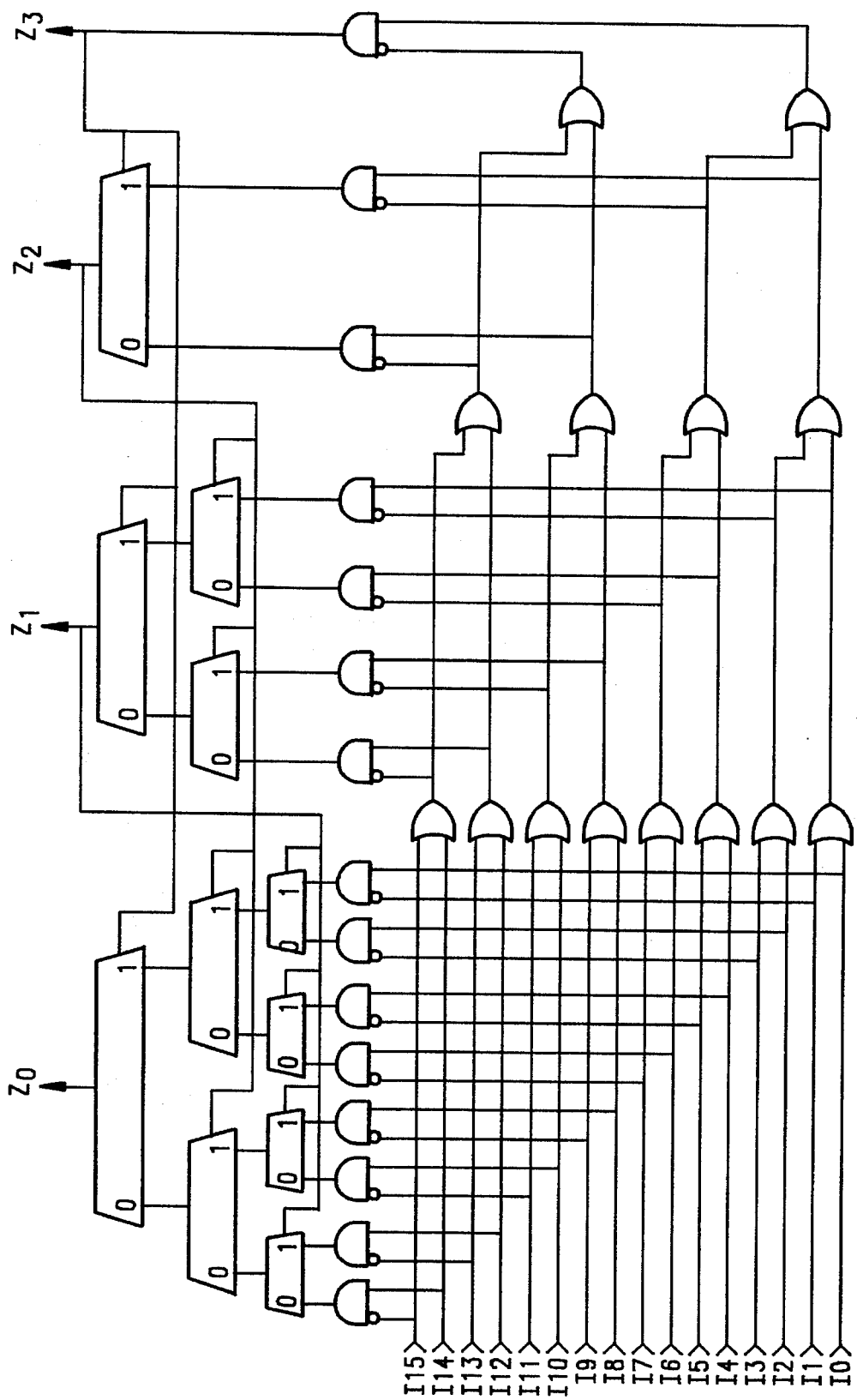
FIG. 3 is a logic diagram of a typical leading zero detector used to fully support a subnormal floating point multiplication operand in hardware.
Figure 4:
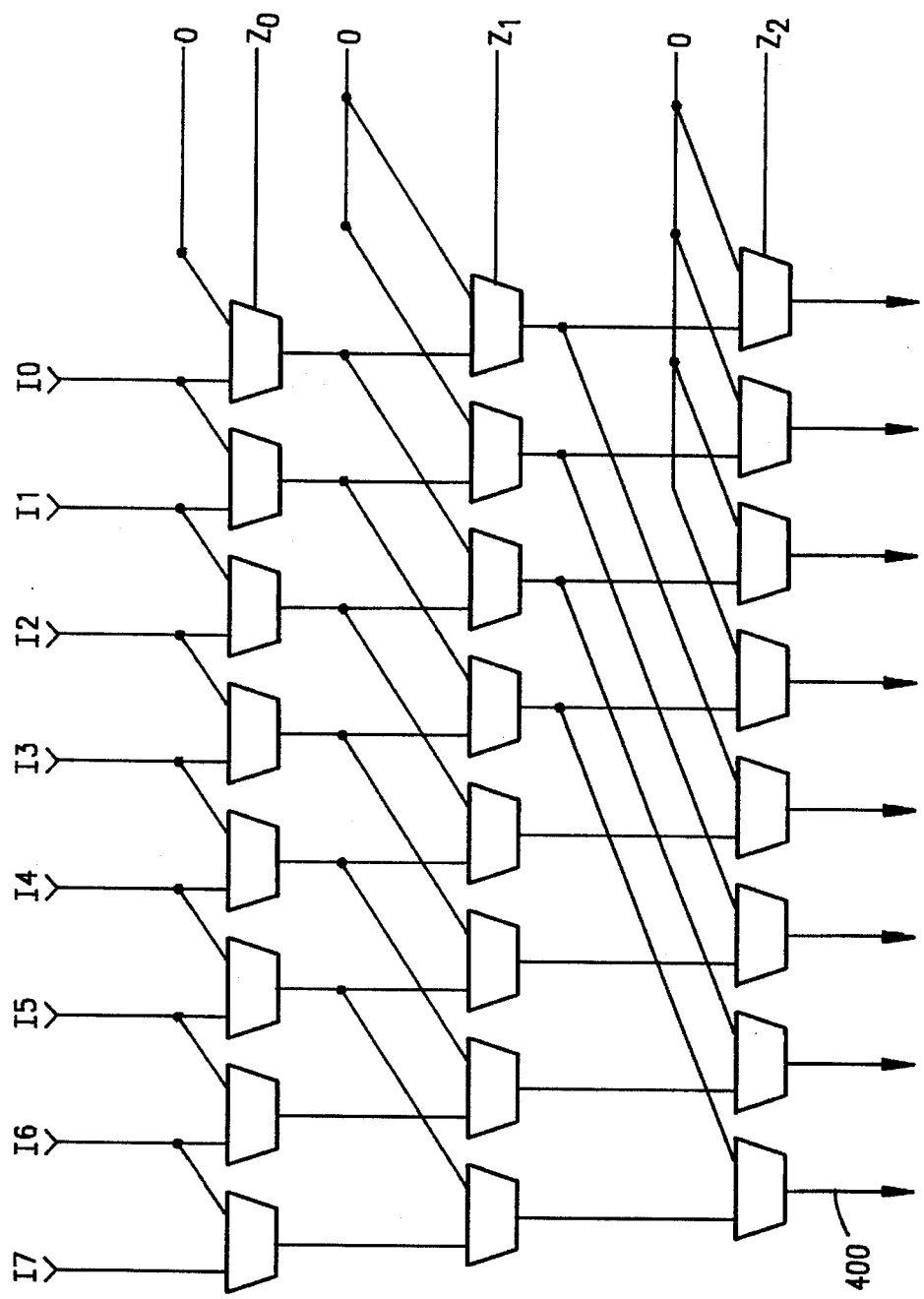
FIG. 4 is a logic diagram of a typical barrel shifter used to implement left shifting and right shifting necessary to fully support a subnormal floating point multiplication operand in hardware.
Figure 5:
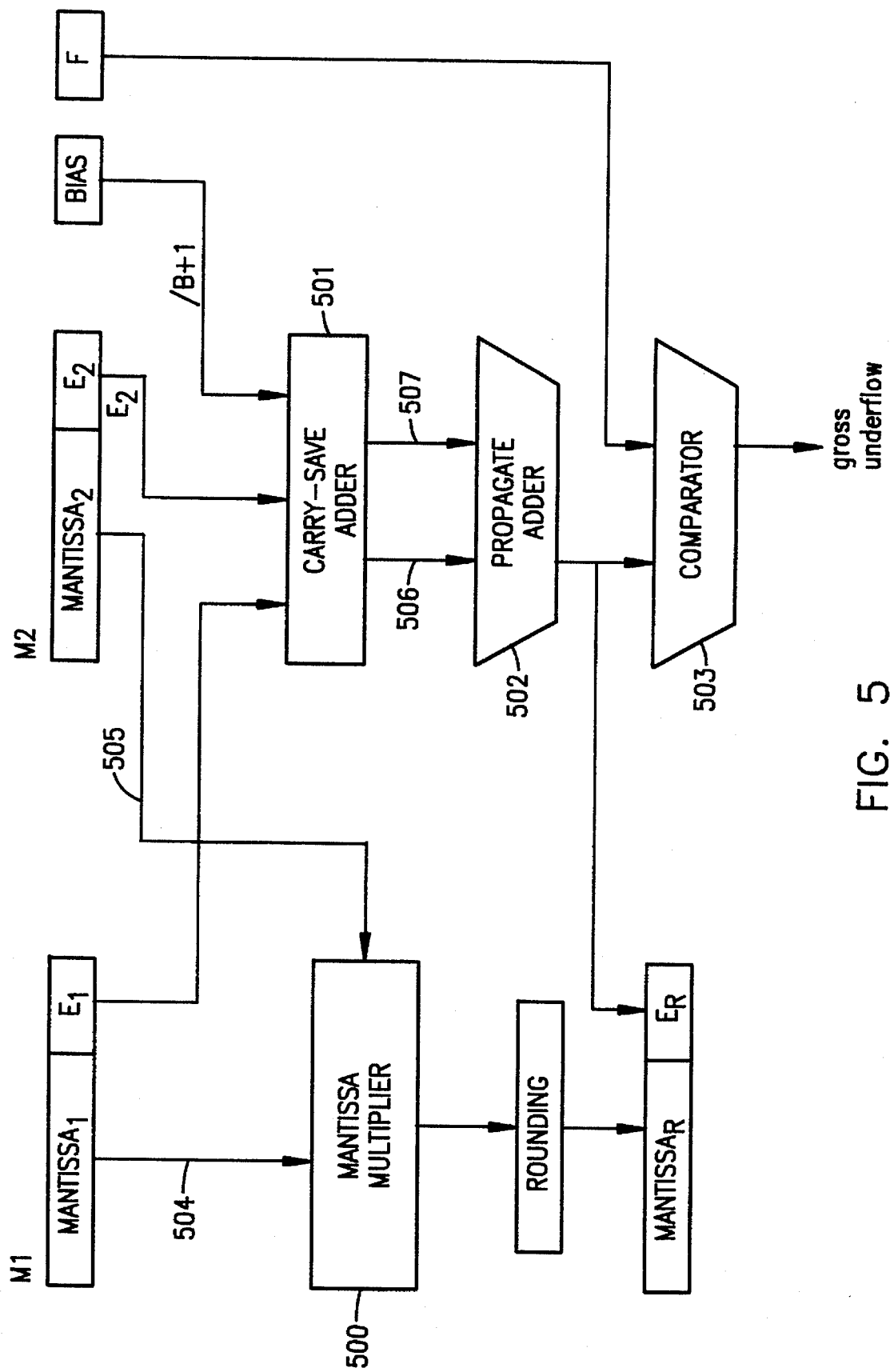
FIG. 5 is a simplified block diagram illustrating an implementation of a floating point multiplier according to the present invention designed to partially support a subnormal operand in hardware.

FIG. 5 illustrates one embodiment of a hardware multiplier according to the present invention. The great advantage of the hardware multiplier according to the present invention is that the amount of hardware required is greatly reduced over its prior art equivalent. This reduction in hardware results in a smaller, simpler circuit which computes the results with less latency for those multiplications which are supported. If included in a processor with a fixed cycle time, the hardware multiplier shown in FIG. 5 is likely to require fewer clock cycles in which to compute its results. So long as the multiplications which are not supported in hardware do not occur very frequently, the hardware multiplier in FIG. 5 is preferable to that prior art multiplier shown in FIG. 2. There is a small minority of operand permutations that are not supported in hardware and thus require a greater time to compute by resorting to software. However, the vast majority of operand permutations gain reduced latency. So long as the fraction of operand permutations that occurs when a typical instruction stream is executing that are not supported in hardware is small, a performance gain is achieved.

In FIG. 5, the mantissas 504 and 505 are directly input into the mantissa multiplier array 500 without going through any leading zero detection. The latency through the mantissa portion of the circuit is reduced because the leading zero detector, the left shifter, and the right shifter are all eliminated as compared to FIG. 2. The latency for the exponent portion of the circuit is similarly reduced because one carry-save adder has been eliminated, and dependency on the output of the leading zero detector is eliminated. In FIG. 5, the exponents E1 and E2 and the bias/B+1 are input into a carry-save adder 501 which produces a carry portion 506 and sum portion 507 as outputs. The sum 507 and carry 506 outputs of the carry-save adder 501 are input into a carry-propagate adder 502 which combines the sum 507 and carry 506 outputs of the carry-save adder 501 into a resultant exponent er. The resultant exponent er is compared by comparator 503 to the number of bits F in the fractional parts of the mantissas of the operands so that it can be determined whether or not gross underflow will occur. The latency of the gross underflow output is determined by the delay through the carry-save adder 501, the propagate adder 502, and the comparator 503. The delay through the propagate adder 502 and the comparator 503 are similar and are large in comparison to the carry-save adder 501.

In equation 2, the detection of leading zeros is required to determine z. By ignoring z altogether, equation 5 becomes a conservative criterion for gross underflow. That is, using only $$er = e1 + e2 - B \tag{6}$$

to determine gross underflow ignores those cases in which gross underflow would occur because of leading zeros present in the subnormal mantissa.

Equations 5 and 6 form the basis used to provide partial subnormal support according to the present invention. If equation 5 is satisfied with the appropriate rounding mode, then the multiplier generates a zero result. The multiplier according to the present invention does not support the case where equation 5 is not satisfied and a subnormal operand is encountered.

Substituting equation 6 into equation 5, the conservative criteria for gross underflow can be expressed as the following equation 7.

$$e1 + e2 - B + F + 2 \leq 0 \tag{7}$$

If inequality 7 is satisfied, gross underflow must occur regardless of whether or not there are any leading zeros in either of the operands. This is a consequence of the fact that the resulting mantissa must be right shifted by more than F+2 bit positions in order to bring the resulting exponent er from a zero or negative value up to a value (one) which is representable in the IEEE subnormal data format. If one of the operands is subnormal and inequality 7 is not satisfied, there are three possibilities which might occur. (1) The appropriate result is normal; (2) the appropriate result is subnormal; and (3) the appropriate result is a gross underflow condition. The hardware in FIG. 5 does not support any of these possibilities, rather it merely traps to software to compute the correct result.

Figure 6:
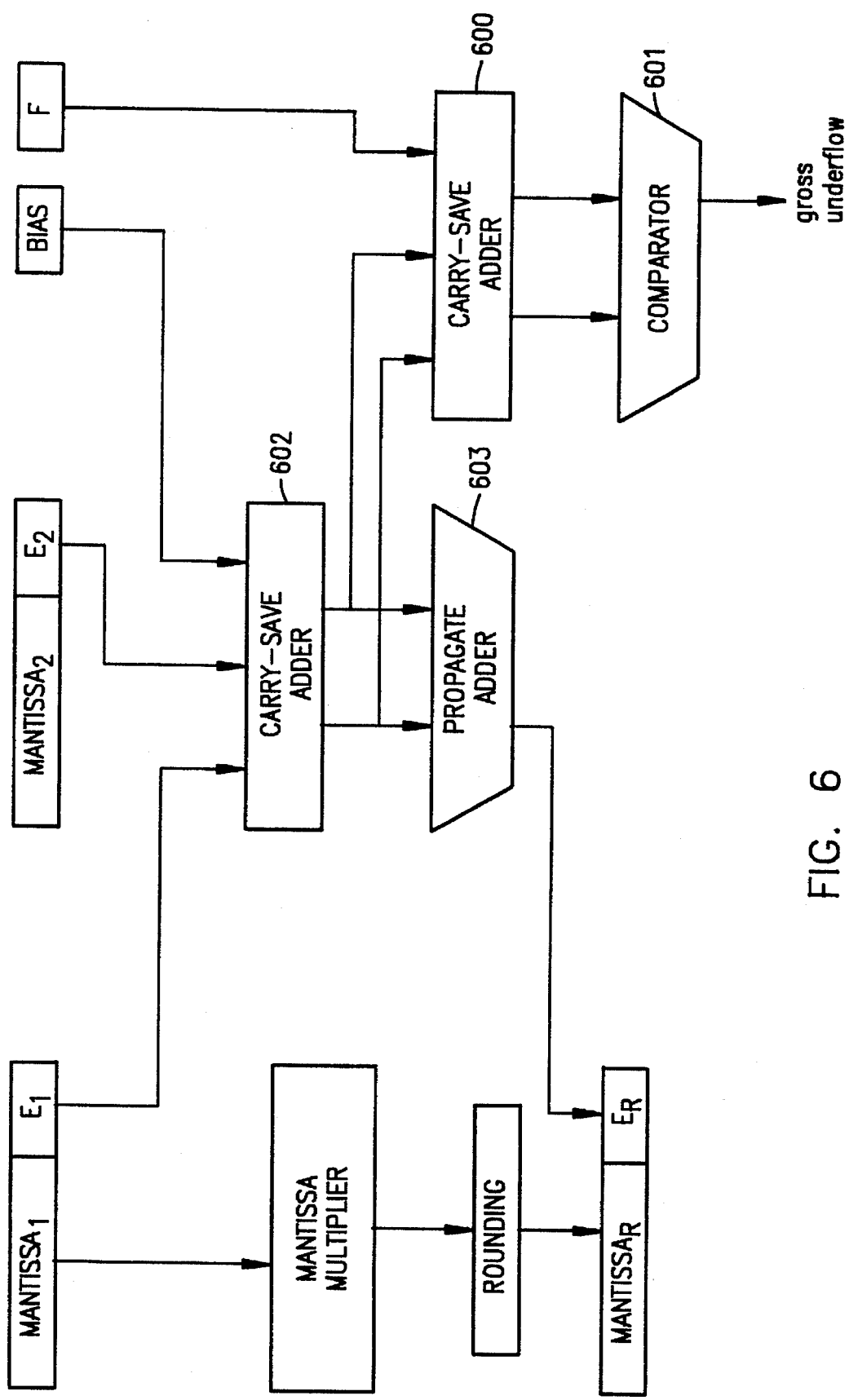
FIG. 6 is a simplified block diagram illustrating an alternate implementation of a floating point multiplier according to the present invention designed to partially support a subnormal operand in hardware.

According to an alternative embodiment of the present invention shown in FIG. 6, the gross underflow output is computed in parallel with the resulting exponent computation. Although the alternative embodiment shown in FIG. 6 requires an additional carry-save adder 600 when compared to the first embodiment shown in FIG. 5, the latency of the gross underflow computation is reduced because only one carry-propagate delay (through comparator 601) is incurred between the inputs e1, e2, B, and F and the gross underflow output.

Using a two's complement representation of $-B$, where $-B = /B + 1$, equation 7 can be written as follows.

$$e1 + e2 + /B + F + 3 \leq 0 \tag{8}$$

Since all the variables in equation 8 are integers, the less than or equal to sign can be replaced by a less than sign while subtracting 1 from the left side of the inequality. Thus the conservative condition for gross underflow becomes the following equation 9.

$$e1 + e2 + /B + F + 2 < 0 \tag{9}$$

Figure 7:
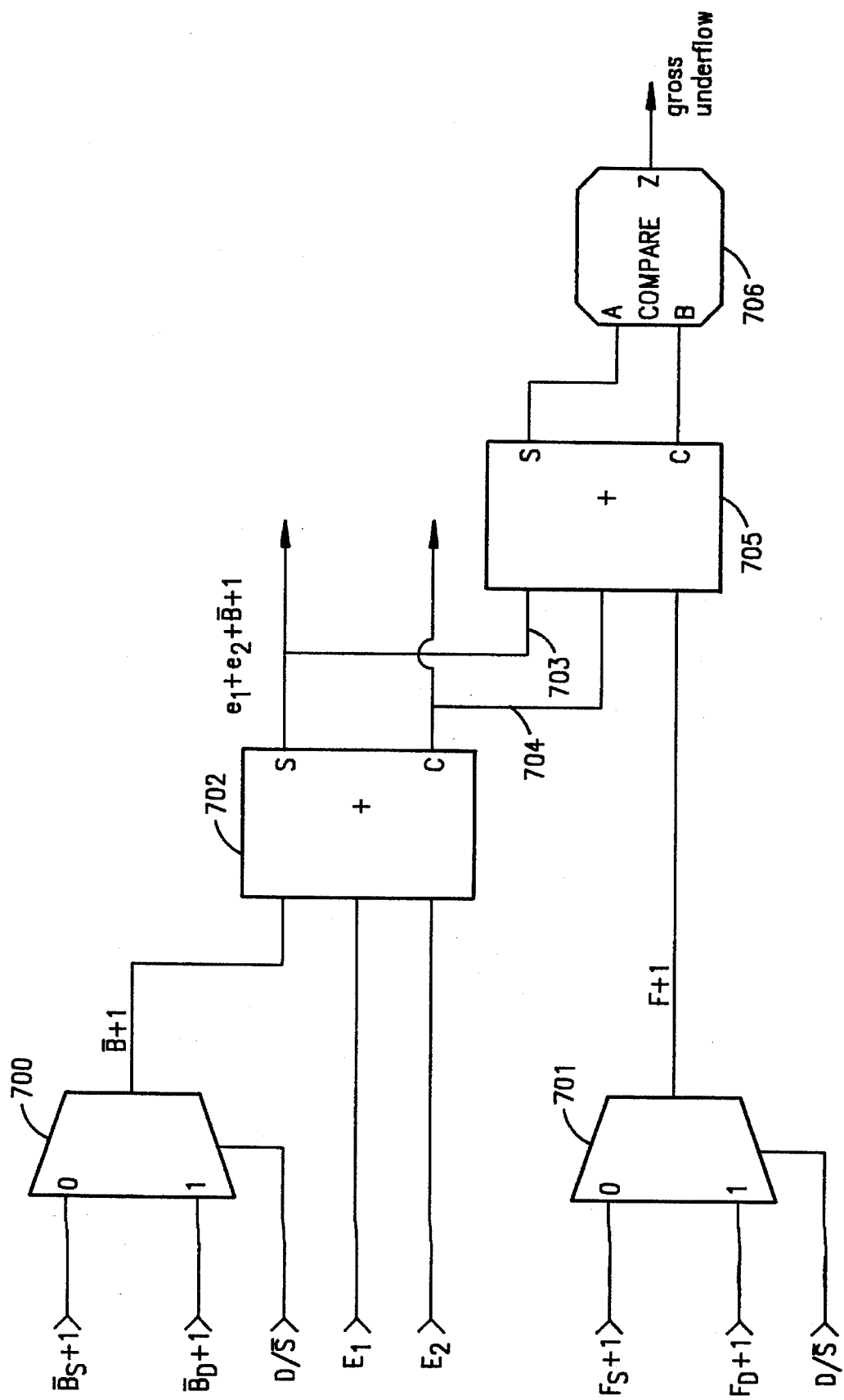
FIG. 7 is a logic diagram of the exponent logic used to partially support a subnormal operand in hardware according to the present invention.

FIG. 7 shows an implementation of the gross underflow detection circuit which can be used for either single or double precision operands. The circuit shown in FIG. 7 implements equation 9, and can be used in conjunction with the alternative embodiment. FIG. 7 shows the logical relationship between the inputs and output without showing any pipeline flip-flops which are likely to exist in a modern high speed application. Multiplexor 700 selects the appropriate bias value. For single precision operands, the appropriate value for the multiplexor output is /Bs+1, which is 0×1F81 in hexadecimal sign extended to 13 bits, and is the two's complement of the single precision bias value 127 Bs. For double precision operands, the appropriate value for multiplexor output is /Bd+1, which is 0×1C01 in hexadecimal sign extended to 13 bits, and is the two's complement of the double precision bias value 1023 Bd. The D/~S signal indicates that the multiplier's operands are double precision when the signal is asserted. When the D/~S signal is deasserted, the multiplier's operands are signal precision quantities. Similarly, a second multiplexor 701 selects the appropriate value for the number of bits in the fraction part of each number. FIG. 7 implements equation 9 as manipulated into the following equation 10.

$$[e1 + e2 + (/B + 1)] + (F + 1) < 0 \tag{10}$$

Multiplexor 701 outputs F+1 rather than F simply because multiplexor 701 is a convenient place in which to program this "extra" one which is necessary to implement equation 10. Therefore, multiplexor 701 outputs 24 for single precision operands and outputs 53 for double precision operands. Carry-save adder 702 takes the operand exponents e1 and e2 as well as B+1 as inputs and produces a sum output 703 and a carry output 704. Carry-save adder 702 is equivalent to carry-save adder 602 shown in FIG. 6, and its outputs 703 and 704 (e1+e2+/B+1) in carry-save form can be directed to propagate adder 603 in FIG. 6. Carry-save adder 705 takes the outputs 703 & 704 from carry-save adder 702 and F+1 output from multiplexor 701 to produce sum and carry outputs that are combined by comparator 706. Comparator 706 produces the gross underflow output signal which indicates that inequality 10 has been satisfied. When the gross underflow signal is asserted, the hardware multiplier returns zero or the smallest subnormal number, depending upon the rounding mode.

Carry-save adders 702 and 705 are used instead of carry-propagate adders in order to reduce the computation delay. Carry-save adders have a fixed latency regardless of the bit lengths of the inputs. Comparator 706 has a latency similar to the carry chain in a full carry-propagate adder. In fact, the comparator 706 can be implemented as merely an adder circuit, where the gross underflow output is the most significant bit—the sign bit—of the output number, while the remaining outputs of the adder are left unconnected. Preferably, the comparator 706 is an optimized carry look ahead circuit.

Figure 8:
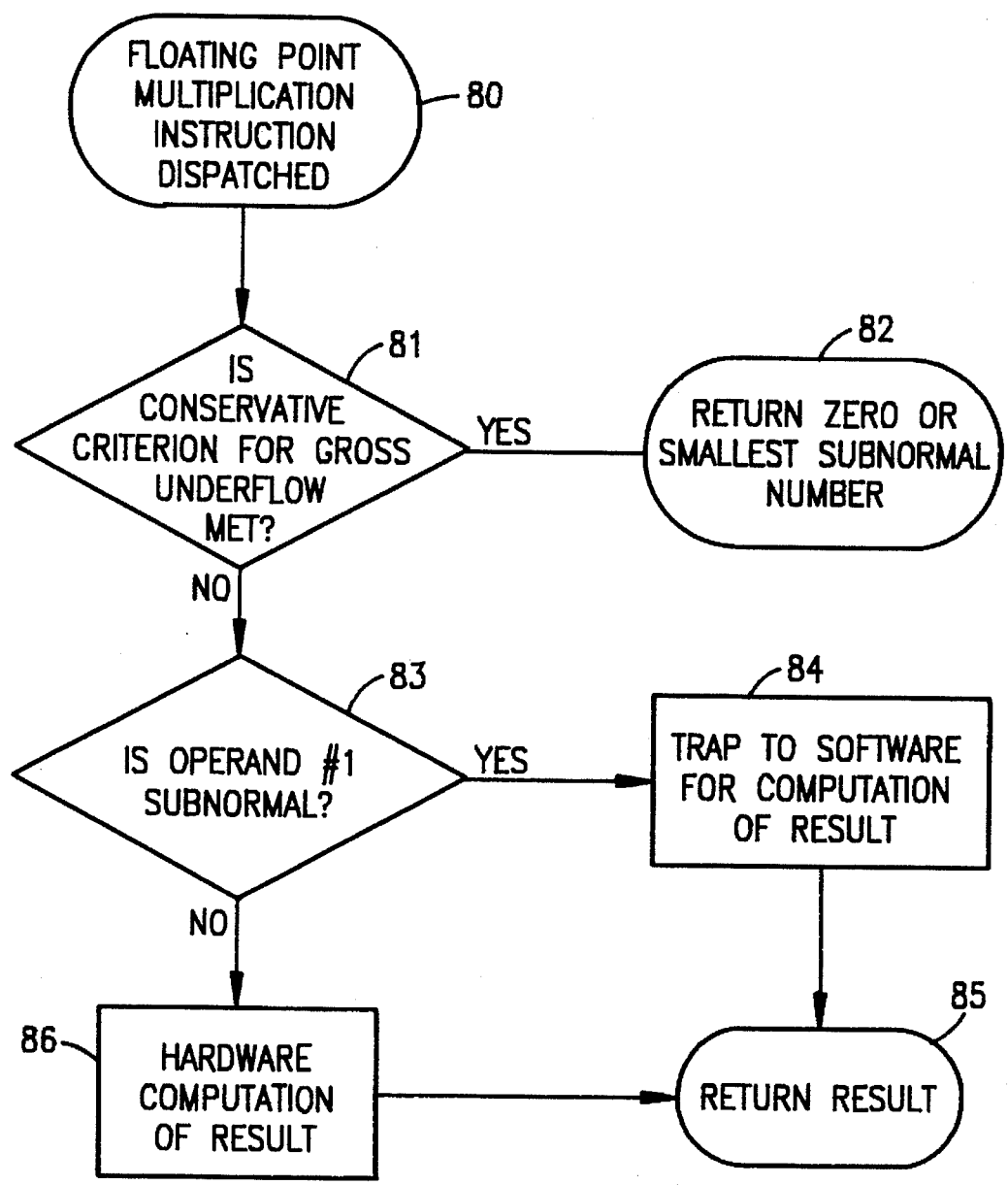
FIG. 8 is a flowchart of the method according to the present invention of supporting a subnormal floating point multiplication partially in hardware and partially in software.

FIG. 8 is a flowchart showing the method for processing floating point multiplication instructions according to the present invention. The method begins at step 80 when a multiplication instruction is dispatched. After a multiplication instruction is dispatch, test 81 determines whether or not the conservative criteria for gross underflow are met (according to equation 9). If test 81 determines that the conservative criteria for gross underflow are met, step 82 provides that zero or the smallest subnormal number are returned. If test 81 determines that the conservative criteria for gross underflow are not met, test 83 determines whether or not the first operand is subnormal. If test 83 determines that the first operand is subnormal, step 84 traps to software for the computation of the result. The result is then returned at step 85. The result computed by software may be zero (because of gross underflow), subnormal, or normal. If test 83 determines that the first operand is not subnormal, step 86 dictates that the operands are provided to the hardware multiplier to compute the result, which is delivered at step 85. The result computed in hardware by step 86 is either subnormal or normal, but is not zero (because of gross underflow). Gross underflow is not possible for a result computed by the hardware because the conservative criteria for gross underflow detects all gross underflows which would be caused by small exponents. Since both operands must be normal for the hardware to compute the result, the conservative criteria detects all gross underflows which the hardware would otherwise process.

While the present invention has been disclosed with particular reference to its preferred embodiments, those embodiments are presented by way of example, not by way of limitation. Those of ordinary skill in the art would be enabled by this disclosure to add to or modify the embodiment of the present invention in various ways as needed and still be within the scope and spirit of the present invention as recited in the appended claims. Accordingly, various changes and modifications which are obvious to a person skilled in the art to which the invention pertains are deemed to lie within the spirit and scope of the invention as claimed.

What is claimed is:

1. A method of producing a result of a floating point multiplication having a first operand and a second operand using a hardware multiplier and a software routine, the method comprising the steps of:

predicting whether the floating point multiplication will cause gross underflow;

returning zero or a smallest subnormal number as the result if the predicting step predicts that the floating point multiplication will cause gross underflow;

detecting whether the first operand is subnormal;

supplying the first operand and the second operand to the hardware multiplier if the detecting step does not detect that the first operand is subnormal and if the predicting step does not predict that the floating point multiplication will cause gross underflow, wherein the hardware multiplier produces the result; and trapping to the software routine if the detecting step detects that the first operand is subnormal and if the predicting step does not predict that the floating point multiplication will cause gross underflow, wherein the software routine produces the result.

2. A method as in claim 1, wherein the first operand includes a first mantissa and a first exponent, wherein the second operand includes a second mantissa and a second exponent, and wherein the predicting step comprises the steps of:

adding the first exponent, the second exponent, and a negative bias to produce a summed input exponent value;

testing whether the summed input exponent value is less than a predetermined value; and determining that the floating point multiplication will cause gross underflow if the testing step finds that the summed input exponent value is less than the predetermined value.

3. A method as in claim 2, wherein the predetermined value is a negative sum of a fraction size and one.

4. A method as in claim 3, wherein the negative bias is −127, the fraction size is 23, and the predetermined value is −24.

5. A method as in claim 3, wherein the negative bias is −1023, the fraction size is 52, and the predetermined value is −53.

6. A method as in claim 1, wherein the returning step returns the smallest subnormal number when a rounding mode is rounding to plus infinity and an output sign is positive or when the rounding mode is rounding to minus infinity and the output sign is negative.

7. A gross underflow detection circuit that takes a first exponent and a second exponent as inputs and produces a gross underflow output, the gross underflow detection circuit comprising:

a first carry save adder that takes the first exponent, the second exponent, and a selected negative bias as inputs and produces a first intermediate carry and a first intermediate sum;

a second carry save adder that takes the first intermediate carry, the first intermediate sum, and a selected incremented fraction size as inputs and produces a second intermediate carry and a second intermediate sum; and a comparator that takes the second intermediate carry and the second intermediate sum as inputs and produces the gross underflow output.

8. A gross underflow detection circuit as in claim 7, further comprising:

an incremented fraction size multiplexor that takes a single precision incremented fraction size and a double precision incremented fraction size as inputs and produces the selected incremented fraction size; and a bias multiplexor that takes a single precision negative bias and a double precision negative bias as inputs and produces the selected negative bias.

9. A gross underflow detection circuit as in claim 8, wherein the single precision incremented fraction size is 24, the double precision incremented fraction size is 53, the single precision negative bias is −127, and the double precision negative bias is −1023.

10. A gross underflow detection circuit as in claim 9, wherein the single precision negative bias is represented in two's complement such that it is 0×1F81, and the double precision negative bias is represented in two's complement such that it is 0×1C01.

11. A gross underflow detection circuit as in claim 7, wherein the comparator is a carry look ahead circuit.

12. A floating point multiplier that takes a first operand having a first mantissa and a first exponent and a second operand having a second mantissa and a second exponent as inputs and produces a result having a resultant mantissa and a resultant exponent, the floating point multiplier comprising:

a mantissa array that takes the first mantissa and the second mantissa as inputs and produces an unrounded resultant mantissa;

a rounding unit that takes the unrounded resultant mantissa as input and produces the resultant mantissa;

a gross underflow detection circuit; and a propagate adder that takes the first intermediate carry and the first intermediate sum as inputs and produces the resultant exponent.

13. A floating point multiplier as in claim 12, wherein the unrounded resultant mantissa has an unrounded carry portion and an unrounded sum portion.

14. A floating point multiplier as in claim 13, wherein the rounding unit includes a final addition circuit that adds the unrounded carry portion and the unrounded sum portion.

15. A method of providing a gross underflow detection circuit that takes a first exponent and a second exponent as inputs and produces a gross underflow output, the method comprising the steps of:

provinding a first carry save adder that takes the first exponent, the second exponent, and a selected negative bias as inputs and produces a first intermediate carry and a first intermediate sum;

providing a second carry save adder that takes the first intermediate carry, the first intermediate sum, and a selected incremented fraction size as inputs and produces a second intermediate carry and a second intermediate sum; and providing a comparator that takes the second intermediate carry and the second intermediate sum as inputs and produces the gross underflow output.

16. A method of providing a gross underflow detection circuit as in claim 15, further comprising the steps of:

providing an incremented fraction size multiplexor that takes a single precision incremented fraction size and a double precision incremented fraction size as inputs and produces the selected incremented fraction size; and providing a bias multiplexor that takes a single precision negative bias and a double precision negative bias as inputs and produces the selected negative bias.

17. A method of providing a gross underflow detection circuit as in claim 16, wherein the single precision incremented fraction size is 24, the double precision incremented fraction size is 53, the single precision negative bias is −127, and the double precision negative bias is −1023.

18. A method of providing a gross underflow detection circuit as in claim 17, wherein the single precision negative bias is represented in two's complement such that it is 0×1F81, and the double precision negative bias is represented in two's complement such that it is 0×1C01.

19. A method of providing a gross underflow detection circuit as in claim 15, wherein the comparator is a carry look ahead circuit.

20. A method of providing a floating point multiplier that takes a first operand having a first mantissa and a first exponent and a second operand having a second mantissa and a second exponent as inputs and produces a result having a resultant mantissa and a resultant exponent, the method comprising the steps of:

providing a mantissa array that takes the first mantissa and the second mantissa as inputs and produces an unrounded resultant mantissa;

providing a rounding unit that takes the unrounded resultant mantissa as input and produces the resultant mantissa;

providing the gross underflow detection circuit of claim 15; and providing a propagate adder that takes the first intermediate carry and the first intermediate sum as inputs and produces the resultant exponent.

21. A method of providing a floating point multiplier as in claim 20, wherein the unrounded resultant mantissa has an unrounded carry portion and an unrounded sum portion.

22. A method of providing a floating point multiplier as in claim 21, wherein the rounding unit includes a final addition circuit that adds the unrounded carry portion and the unrounded sum portion.

* * * * *